(12) United States Patent
Chang

(10) Patent No.: US 8,253,015 B2
(45) Date of Patent: Aug. 28, 2012

(54) ELECTRONIC DEVICE ENCLOSURE

(75) Inventor: Chin-Ming Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 344 days.

(21) Appl. No.: 12/628,228

(22) Filed: Dec. 1, 2009

(65) Prior Publication Data

US 2010/0319950 A1 Dec. 23, 2010

(30) Foreign Application Priority Data

Jun. 18, 2009 (CN) .......................... 2009 1 0303399

(51) Int. Cl.
*H05K 5/00* (2006.01)

(52) U.S. Cl. ..... 174/50; 174/520; 174/559; 361/679.02; 361/724; 361/753; 312/223.1; 312/223.2

(58) Field of Classification Search .................... 174/50, 174/53, 57, 58, 17 R, 520, 17 CT, 539, 559, 174/560, 564; 220/3.2–3.9, 4.02; 361/600, 601, 679.01, 679.02, 679.03, 724, 730, 753, 727; 312/223.1, 223.2, 223.3
See application file for complete search history.

(56) References Cited

U.S. PATENT DOCUMENTS

| | | | | |
|---|---|---|---|---|
| 3,691,432 | A | * | 9/1972 | Edfors et al. .................. 361/730 |
| 6,028,769 | A | * | 2/2000 | Zurek ............................ 361/727 |
| 6,114,622 | A | * | 9/2000 | Draeger ........................ 361/753 |
| 6,137,694 | A | * | 10/2000 | Kerrigan et al. ......... 361/679.02 |
| 7,372,705 | B1 | * | 5/2008 | Spivey et al. ................. 174/520 |
| 7,561,431 | B2 | * | 7/2009 | Cheng et al. ............. 361/679.02 |

* cited by examiner

*Primary Examiner* — Angel R Estrada
(74) *Attorney, Agent, or Firm* — Altis Law Group, Inc.

(57) ABSTRACT

An electronic device enclosure includes a fixing frame, a chassis, and two panels. The chassis and the panels are correspondingly mounted to different sides of the fixing frame. The fixing frame is sealed by the chassis and the panels. A plurality of rubber gaskets is correspondingly mounted between the fixing frame and each of the panels and the chassis, to prevent moisture and dust from entering.

6 Claims, 3 Drawing Sheets

ELECTRONIC DEVICE ENCLOSURE

BACKGROUND

1. Technical Field

The present disclosure relates to an electronic device enclosure.

2. Description of Related Art

With the development of electronic technology, demands on electronic devices, such as moisture resistance, dust tightness, and shock resistance, have increased.

DETAILED DESCRIPTION

Figure 1:
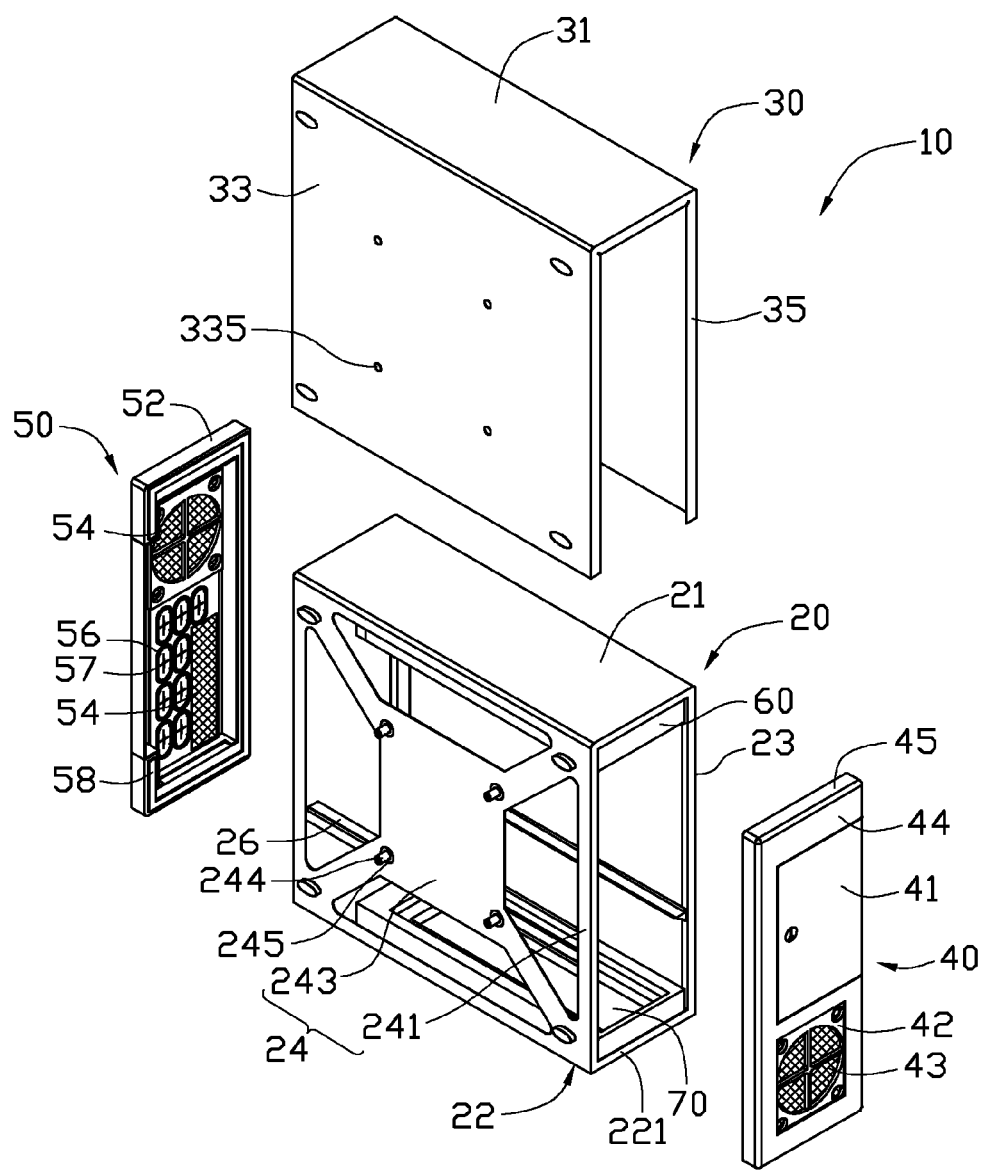
FIG. 1 is an exploded, isometric view of an embodiment of an electronic device enclosure.
Figure 2:
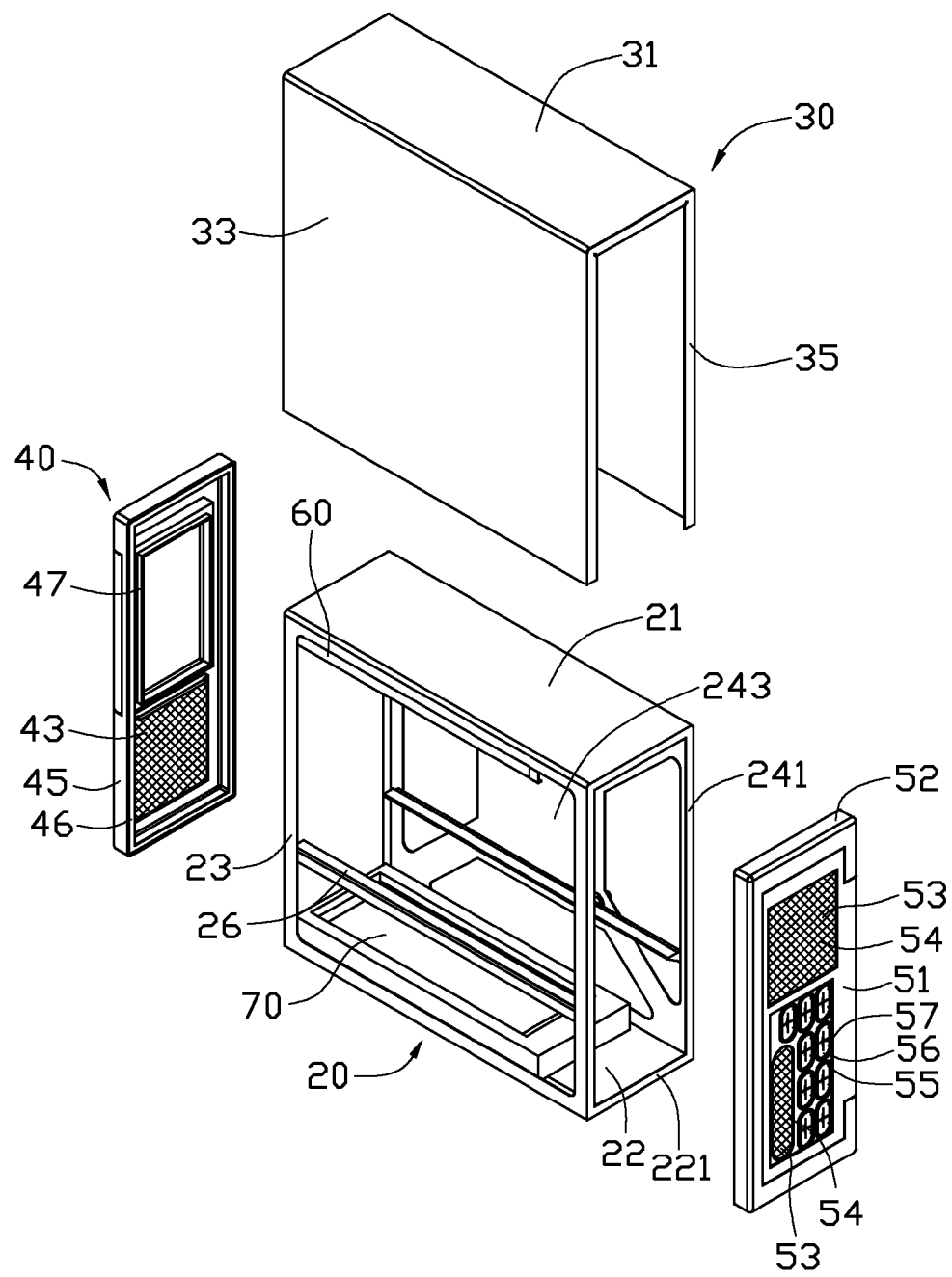
FIG. 2 is a reversed view of the electronic device enclosure of FIG. 1.

Referring to FIGS. 1 and 2, an embodiment of an electronic device enclosure 10 includes a fixing frame 20, a chassis 30, a first panel 40, a second panel 50, a first shockproof member 60, and a second shockproof member 70.

The fixing frame 20 includes a first plate 21, a second plate 22 opposite to the first plate 21, a first side portion 23, and a second side portion 24 opposite to the first side portion 23. The second plate 22 includes opposite flanges 221. The first side portion 23 includes two supporting arms connected perpendicular between corresponding first sides of the first and second plates 21 and 22. The second side portion 24 includes two supporting arms 241 connected perpendicular between corresponding second sides of the first and second plates 21 and 22, and a side plate 243 connected between the supporting arms 241. Four latches 244 protrude from an outer side of the side plate 243, and a rubber gasket 245 is formed on each latch 244, adjoining the side plate 243. Two parallel slide rails 26 are mounted inside the fixing frame 20, one of which is connected perpendicular between the supporting arms of the first side portion 23, and the other connected perpendicular between the supporting arms 241 of the second side portion 24. The slide rails 26 are parallel to the first plate 21, and are slidable relative to the first plate 21, between the first and second plates 21 and 22.

The chassis 30 includes a first sidewall 31, and two opposite second sidewalls 33 connected perpendicular to opposite sides of the first sidewall 31. Two flanges 35 extend perpendicular from opposite ends of each of the first and second sidewalls 31 and 33. Four through holes 335 are defined in one of the second sidewalls 33, corresponding to the latches 244 of the second side portion 24 of the fixing frame 20.

The first panel 40 includes a main body 44 and four side rims 45 extending perpendicular from two sides and two ends of the main body 44. A door 41 is pivotally coupled to an upper portion of the main body 44, and a ventilation section 42 is formed on a lower portion of the main body 44. An annular rubber gasket 47 is mounted to a joint of the door 41 and the main body 44, for sealing the door 41 to the main body 44, to resist moisture and dust. A dust filter 43 is mounted to an inner side of the ventilation section 42. An annular rubber gasket 46 is mounted to inner sides of the side rims 45.

The second panel 50 includes a main body 51 and four side rims 52 extending perpendicular from two sides and two ends of the main body 51. Two ventilation sections 53 are respectively formed on an upper portion and a lower portion of the main body 51. Each ventilation section 53 is covered with a dust filter 54. A plurality of holes 55 is defined in the lower portion of the main body 51, and a rubber piece 56 is mounted in each hole 55. The plurality of holes 55 is covered with the corresponding rubber pieces 56. A cross-shaped slot 57 is defined in a middle of each rubber piece 56, to allow a cable therethrough and close in the absence of such a cable. An annular rubber gasket 58 is mounted to inner sides of the side rims 52.

The first shockproof member 60 and the second shockproof member 70 are box shaped and of soft cushioning material.

Figure 3:
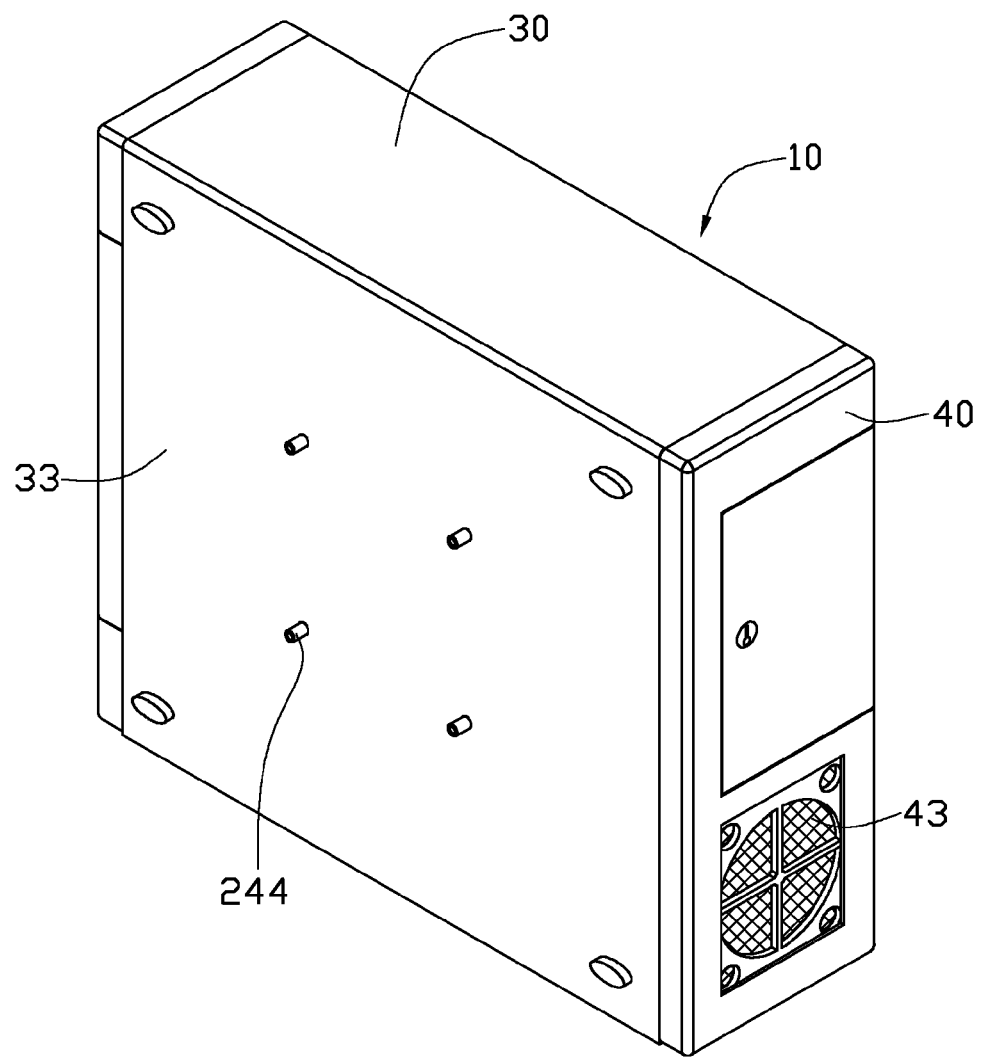
FIG. 3 is an assembled, isometric view of the electronic device enclosure of FIG. 1.

Referring to FIG. 3, when an electronic device, such as a computer, is installed in the electronic device enclosure 10, the first and second shockproof members 60 and 70 are correspondingly mounted to a top and a bottom of the electronic device. The electronic device with the first and second shockproof members 60 and 70 is impelled into the fixing frame 20 from an end of the fixing frame 20. When the electronic device is tall, the electronic device and the second shockproof member 70 are supported on the second plate 22 of the fixing frame 20, the first shockproof member 60 engages with the first plate 21. When the electronic device is short, the electronic device and the second shockproof member 70 are supported on the slide rails 26 of the fixing frame 20. The slide rails 26 are moved to allow the first shockproof member 60 to engage the first plate 21, such that the electronic device is sandwiched between the first and second shockproof members 60 and 70, and protected thereby from vibration.

The chassis 30 is mounted to the fixing frame 20 via hooks or screws, to allow the first sidewall 31 of the chassis 30 to cover the first plate 21 of the fixing frame 20, the second sidewalls 33 of the chassis 30 to correspondingly cover the first side portion 23 and the second side portion 24 of the fixing frame 20, and the flanges 35 of the of the chassis 30 to correspondingly cover opposite ends of the fixing frame 20. The latches 244 of the second side portion 24 of the fixing frame 20 extend through the corresponding through holes 335 of the corresponding second sidewall 33 of the chassis 30. The rubber gaskets 245 engage an inner side of the second sidewall 33 and cover the corresponding through holes 335, to resist moisture.

The first and second panels 40 and 50 are correspondingly mounted to opposite ends of the chassis 30 via hooks or screws. The annular rubber gasket 46 of the first panel 40 closely contacts the flanges 221 and 35 of the fixing frame 20 and the chassis 30 at one end of the fixing frame 20, and the annular rubber gasket 58 of the second panel 50 closely contacts the flanges 221 and 35 of the fixing frame 20 and the chassis 30 at the opposite ends of the fixing frame 20, to prevent moisture and dust from entering. The electronic device enclosure 10 is moisture-proof, dustproof, and shockproof, and the electronic device is capable of being fixed to a wall thereof via the latches 244.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An electronic device enclosure, comprising:
a fixing frame;

a chassis;

two panels, wherein the chassis and the panels are correspondingly mounted to different sides of the fixing frame, the fixing frame is sealed by the chassis and the panels; and a plurality of rubber gaskets correspondingly mounted between the fixing frame and each of the panels and the chassis, wherein the fixing frame comprises a first plate, a second plate opposite to the first plate, a first side portion, and a second side portion opposite to the first side portion, the chassis comprises a first sidewall covering the first plate of the fixing frame, and two opposite second sidewalls perpendicular to the first sidewall and correspondingly covering the first side portion and the second side portion of the fixing frame, each of the first and second side portions comprises two supporting arms connected between the first plate and the second plate of the fixing frame, the second side portion further comprises a side plate connected between the corresponding supporting arms, a plurality of latches protrudes from an outer side of the side plate, and a corresponding second sidewall of the chassis defines a plurality of through holes to allow the plurality of latches to extend therethrough.

2. The electronic device enclosure of claim 1, wherein a slide rail is mounted inside the fixing frame between the supporting arms of each of the first and second side portions, wherein the slide rail is parallel to and sidable relative to the first plate of the fixing frame.

3. The electronic device enclosure of claim 1, wherein a rubber gasket on each latch adjoining the side plate engages an inner side of the corresponding second sidewall of the chassis and covers a corresponding through hole.

4. The electronic device enclosure of claim 3, wherein one of the panels defines a hole covered with a rubber piece in which a cross-shaped slot is defined.

5. The electronic device enclosure of claim 4, wherein each of the panels defines a ventilation section, each ventilation section being covered with a dust filter.

6. The electronic device enclosure of claim 5, further comprising two shockproof members of cushioning material mounted to inside surfaces of the first and second plates of the fixing frame.

* * * * *